March 27, 1934. R. W. GOTSHALL 1,952,545
METHOD OF PROVIDING GROUSER TYPE TRACK SHOES
Filed March 7, 1931 2 Sheets-Sheet 1
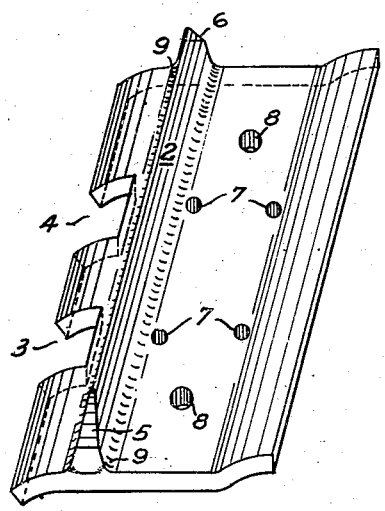
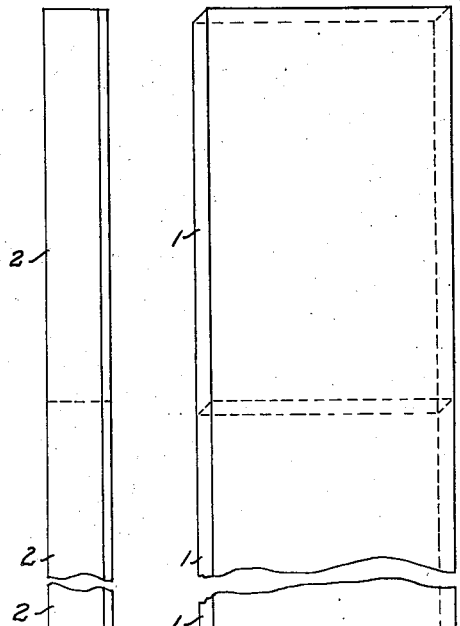
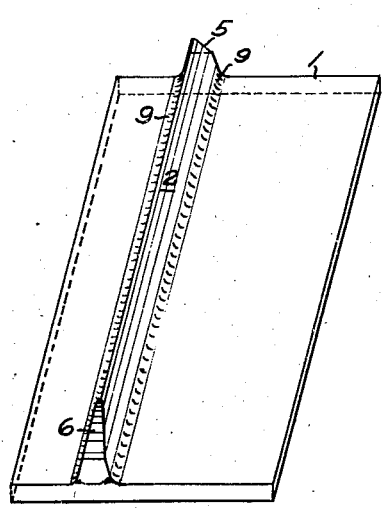
Inventor
R. W. Gotshall
by
Attorney

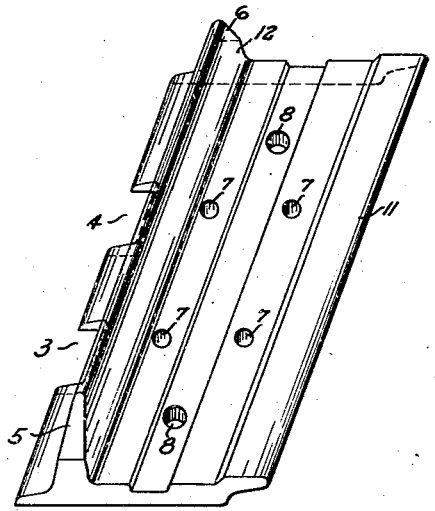
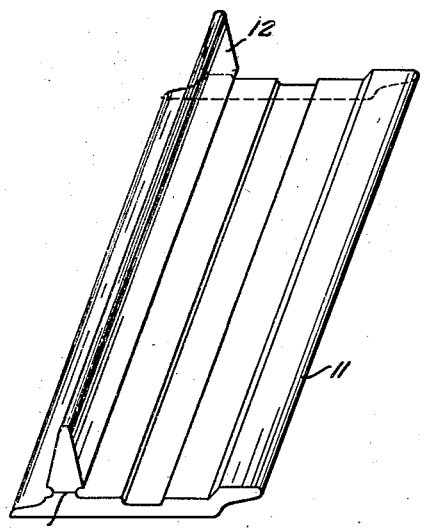
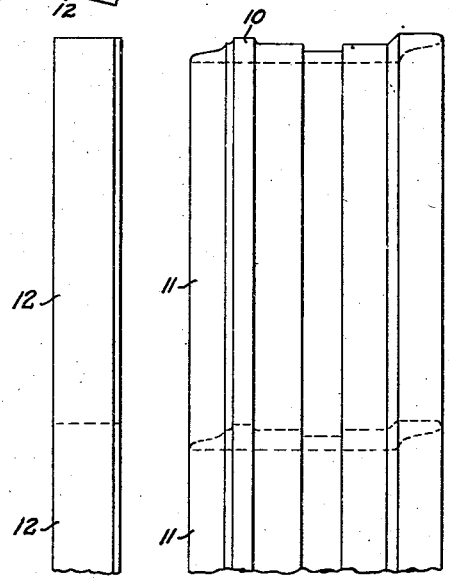
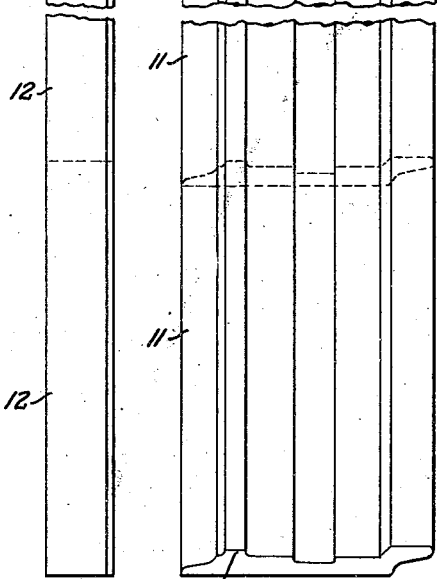

Patented Mar. 27, 1934

1,952,545

UNITED STATES PATENT OFFICE 1,952,545

METHOD OF PROVIDING GROUSER TYPE TRACK SHOES

Robert W. Gotshall, Springfield, Ill., assignor to Allis-Chalmers Manufacturing Company, Milwaukee, Wis., a corporation of Delaware Application March 7, 1931, Serial No. 520,994

3 Claims. (Cl. 29—148.3)

This invention relates to methods of making track shoes for track belts of track-laying vehicles, and pertains more specifically to the manufacture of such track shoes.

The type of track shoe to which the invention has reference comprises a tread portion adapted to be fastened to the link structure of a track belt, and a grouser portion projecting from said tread portion so as to produce efficient tractive engagement of the track belt with the ground. Experience has shown that track shoes of this type are subject to considerable wear during the operation of the vehicle in which they are used, as the grouser portions are continually forced to enter and leave the ground while the vehicle advances. Due to these unfavorable operating conditions the life of the track shoes depends primarily on the wear resistance of the material of which the grouser portions are made, and the principal object of the invention, therefore, is to provide a method of making track shoes whose grouser portions are particularly adapted to resist the wear to which they are subject in operation. The following steps are contemplated in carrying out the method according to the invention. Forming a first metal strip having a thickness corresponding substantially to the thickness of the tread portion of the finished track shoe and a length equal to the combined length of a plurality of said tread portions. Forming a second metal strip having a width corresponding substantially to the height of the grouser portion extending from the tread portion of the finished track shoe and a length equal to the combined length of a plurality of said grouser portions. Severing said first metal strip into a plurality of plates to constitute tread portions of the finished track shoe. Severing said second metal strip into a plurality of plates to constitute grouser portions of the finished track shoe. Welding a grouser portion plate to a tread portion plate in a relative position corresponding to the relative position of the tread and grouser portions of the finished track shoe. From a manufacturing standpoint this method offers the advantage that the metal strips can be rolled from a bar and, therefore, large quantities of tread portion plates and grouser portion plates can be supplied at low costs. Considering on the other hand, the physical properties of the product, the method provides for a wide range of varieties, and the requirement of giving the grouser portion of the track shoe exceptional wear resistance can be easily satisfied by making the grouser portion harder than the tread portion. This result is preferably accomplished by rolling the strips for the grouser and tread portion plates from steel bars of different carbon content, the steel for the grouser plates having a greater carbon content than the steel for the tread plates. The grouser plates having a suitable carbon content may be heat treated and hardened to any desired degree before they are welded to the tread plates.

Other objects and advantages of the invention will be apparent from the following description. A clear conception of a series of specific steps taken to carrying out the invention in a preferred manner may be had by referring to the drawings accompanying and forming a part of this specification, in which like reference characters designate the same or similar parts in the several views.

Fig. 1 is a perspective view of a strip of stock material equal in length to the combined length of a plurality of track shoes.

Fig. 2 is a side elevation of a strip of stock material equal in length to the combined length of a plurality of track shoes.

Fig. 3 is an end view of the strip of stock material shown in Fig. 2.

Fig. 4 is a perspective view showing the tread member and the grouser member of a track shoe in assembled position.

Fig. 5 is a perspective view of a finished track shoe.

Figs. 6 and 7 shows strips of stock material for track shoes of a modified construction.

Fig. 8 is an end view of the strip shown in Fig. 7.

Figs. 9 and 10 show a track shoe of modified construction in different stages of manufacture.

The strip of stock material shown in Fig. 1 may be produced in any suitable manner, for instance by cutting it from a commercial size steel plate, but preferably it is produced by rolling a steel bar to the desired width and shape. Likewise the wedge shaped strip of stock material shown in Figs. 2 and 3 may be produced by rolling a steel bar to the desired width and shape. The strip shown in Fig. 1 is supposed to have the same thickness as the tread portion of the finished track shoe shown in Fig. 5, and the strip shown in Fig. 2, on the other hand, is supposed to have a width substantially equal to the height of the grouser portion of the finished track shoe. Both strips are cut into a plurality of plates 1 and 2, respectively, as indicated by dotted lines in Figs. 1 and 2, the plates 1 being tread portion plates and the plates 2 grouser portion plates. The tread portion plates obtained from the metal strip shown in Fig. 1 are substantially plane and of rectangular shape as shown in Fig. 4, each plate having opposite longitudinal edges and transverse edges extending between the longitudinal edges. For purposes of definition, the long sides of the rectangle will be called hereafter the transverse edges of the tread plate and the short sides will be called the longitudinal edges because in the assembled track belt the short sides of the plates will extend longitudinally of the track and the long sides will extend transversely of the track. The relative spacing of the short sides of the rectangle corresponds to the width of the finished track shoe, that is, the finished track shoe, when assembled with the chain structure of the track belt, has a width, transversely of the track, equal to the relative spacing of the longitudinal edges of the plane tread plate portion. In order to form a track shoe one of the grouser portion plates is welded to a tread portion plate in the relative position shown in Fig. 4, that is, in the position which the mentioned parts have relative to each other in the finished track shoe. The base of the grouser plate is preferably narrowed down as shown in Figs. 4 and 5 in order to provide suitable grooves in which binding metal 9 may be deposited from a welding electrode or in any other manner. The narrow base of the tread plate providing said grooves is obtained according to the invention by rolling the grouser strip to the section shown in Fig. 3, or to any equivalent shape whereby a reduced thickness of the grouser strip is obtained at the base. The finished shape of the track shoe shown in Fig. 5 includes, as will be seen from said figure, an upwardly curved portion of the tread plate along one of its transverse edges and a downwardly curved portion along the other of its transverse edges, which shape makes the tread plate adapted to be brought in overlapping relation with a similarly deformed tread plate in the assembled track belt. The mentioned upward and downward curvatures of the tread plate along its transverse edges are obtained by suitably bending portions of the originally plane tread plate, extending along said transverse edges, into the desired shape, which may be accomplished by means of a set of correspondingly shaped dies or in any other suitable manner. It is considered essential, however, that the bending operation be performed after the tread plates are cut from the strip shown in Fig. 1, because in that manner an accurate shape of the curved portions and a consequent accurate fit of the track shoes with each other at the overlapping ends as well as with the chain structure will be insured. Notches 3 and 4 may be punched out of the tread plate at one side to prevent packing of soil between the overlapping portions of adjacent track shoes in the assembled track belt, and the corners of the grouser portion may be beveled as shown at 5 and 6 in Figs. 4 and 5. Finally, holes 7 and 8 may be provided in the tread plate, the holes 7 serving for fastening the track shoe to the link structure of the track belt, and the holes 8 serving for fastening grouser protecting shoes or other attachments to the track shoe.

It will be seen that a track shoe manufactured according to the invention may easily be provided with a grouser portion which is much harder than the tread portion. This result may be accomplished for instance by making the grouser strip shown in Fig. 3 of a high carbon steel, and the tread portion strip shown in Fig. 1 of a medium carbon steel. The high carbon grouser strip may be rolled to the shape shown in Fig. 2 and then cut into lengths corresponding to that required for the individual shoes. Before the grouser plates obtained in this manner are welded to the tread plates they may be hardened to any desired degree, and if it is desired to have their corners beveled as shown at 5 and 6 in Figs. 4 and 5, corresponding shearing operations are preferably performed before the plates are hardened. After welding the hardened grouser plates to the tread plates the latter may be subjected to a cold pressing operation in order to form the overlapping edges, and also any subsequent punching and drilling operations required in finishing the track shoe may be performed without difficulties as the excessive hardness of the grouser portion is not required for the tread plate and the latter is made of a correspondingly chosen material.

As a modification of the method described hereinbefore the tread portion strip may be rolled to the shape shown in Fig. 6 and the grouser portion strip may be rolled to the shape shown in Figs. 7 and 8. It will be seen that in the strip shown in Fig. 6 all the distortion required to produce the overlapping portions at the edges of the shoe is secured by rolling while the material is heated and that it will not be necessary to subject the shoe to any subsequent cold bending operations. The material from which this strip is rolled can therefore be of a somewhat greater hardness than the material used for the tread portion of the track shoe shown in Fig. 5 whose edges were originally straight as shown in Fig. 4. The advantage of a comparatively hard tread member can also be obtained, however, by rolling the tread portion strip to a semi-finish shape, that is to a shape which requires only little bending in order to produce the overlapping edges.

Another particular feature of the tread portion strip shown in Fig. 6 is the protrusion 10 extending longitudinally between the lateral edges of the strip. The protrusion has a flat top surface of a width equal to the width of the surface at the contracted base of the grouser strip shown in Figs. 7 and 8, and the tread plates 11 and grouser plates 12 cut from these strips are particularly adapted to be joined together by resistance welding. Fig. 8 shows the relative position into which the tread and grouser plates are brought before the current is applied, and Fig. 9 shows the plates welded together, the holes 7 and 8 drilled into the tread plate and the notches 3 and 4 punched out of one of the overlapping edges. The corners of the grouser portion 12 may be beveled as shown at 5 and 6, in the same manner as described in connection with the grouser portion 2 in Figs. 4 and 5.

It should be understood that it is not intended to limit the invention to the details of procedure disclosed hereinbefore, for various modifications within the scope of the claims may occur to persons skilled in the art.

It is claimed and desired to secure by Letters Patent:

1. A method of making grouser type track shoes, which comprises providing a substantially plane tread plate consisting of comparatively soft metal and having opposite longitudinal edges and transverse edges extending between said longitudinal edges, the relative spacing of said longitudinal edges corresponding to the spacing of the longitudinal edges of the finished track shoe, bending a portion of said plane tread plate along one of said transversely extending edges thereof so as to elevate said edge relative to the plane of said tread plate, and welding a grouser portion of comparatively hard metal to said tread plate in a position so as to extend transversely to said longitudinal edges thereof.

2. A method of making grouser type track shoes, which comprises providing a substantially plane tread plate consisting of comparatively soft metal and having opposite longitudinal edges and two relatively spaced transverse edges extending between said longitudinal edges, the relative spacing of said longitudinal edges corresponding to the spacing of the longitudinal edges of the finished track shoe, bending said tread plate so as to curve a portion along one of said transverse edges thereof upwardly and so as to curve a portion along the other of said transverse edges thereof downwardly, and welding a grouser portion of comparatively hard metal to said tread plate in a position so as to extend transversely to said longitudinal edges thereof.

3. A method of making grouser type track shoes, which comprises providing a substantially plane tread plate consisting of comparatively soft metal and having opposite longitudinal edges and transverse edges extending between said longitudinal edges, the relative spacing of said longitudinal edges corresponding to the spacing of the longitudinal edges of the finished track shoe, bending a portion of said plane tread plate along one of said transverse edges thereof into arcuate shape, punching mud clearances into that portion of said tread plate which is subjected to said bending operation, and welding a grouser portion of comparatively hard metal to said tread plate in a position so as to extend transversely to said longitudinal edges thereof.

ROBERT W. GOTSHALL.